United States Patent
Truffaut et al.

(10) Patent No.: US 6,244,680 B1
(45) Date of Patent: Jun. 12, 2001

(54) DETECTING QUANTITY OF RESIDUAL PRODUCT IN A MOVABLE RESERVOIR

(75) Inventors: Christophe Truffaut, Rennes; Pascal Coudray, La Chapelle des Fougeretz; Marie-Hélène Froger, Chateaugiron; Alexandre Dodge, Pace, all of (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/736,941

(22) Filed: Oct. 25, 1996

(30) Foreign Application Priority Data

Nov. 8, 1995 (FR) .................................. 95 13220
Jan. 31, 1996 (FR) .................................. 96 01158

(51) Int. Cl.[7] .................................................. B41J 2/195
(52) U.S. Cl. .................................................. 347/7
(58) Field of Search ........................... 347/7, 3, 14, 17, 347/37

(56) References Cited

U.S. PATENT DOCUMENTS

| 5,206,668 | 4/1993 | Lo et al. .................................. 347/6 |
| 5,250,957 | * 10/1993 | Onozato .................................. 347/7 |
| 5,264,769 | * 11/1993 | Itoh .................................. 318/685 |
| 5,617,122 | * 4/1997 | Numata et al. .................. 347/14 |
| 5,699,090 | * 12/1997 | Wade et al. .................. 347/7 |
| 6,012,794 | * 1/2000 | Nakano et al. ................ 347/7 |

FOREIGN PATENT DOCUMENTS

| 0356067 | 2/1990 | (EP) | .................. G01G/19/03 |
| 0551014 | 7/1993 | (EP) | .................. B41J/2/175 |
| 0588616 | 3/1994 | (EP) | .................. B41J/2/51 |
| 2-165954 | 6/1990 | (JP) | .................. B41J/2/01 |
| 3218845 | 9/1991 | (JP) | .................. B41J/2/175 |

* cited by examiner

*Primary Examiner*—N. Le
*Assistant Examiner*—Michael Nghiem
(74) *Attorney, Agent, or Firm*—Fitzpatrick, Cella, Harper & Scinto

(57) ABSTRACT

Detecting a quantity of a product remaining in a reservoir subjected, during use of the product, to a driving movement. The reservoir is driven in accordance with reference signals representing target movements. The reference signals including at least one test reference signal. The position of the reservoir in response to the test reference signal is detected. The quantity of product remaining in the reservoir is determinable from the detected position. Alternatively, a change in temperature caused by moving the reservoir in response to the test reference signal is detected, and the quantity of product remaining in the reservoir is determinable from the change in temperature.

67 Claims, 9 Drawing Sheets

DETECTING QUANTITY OF RESIDUAL PRODUCT IN A MOVABLE RESERVOIR

Figure 1:
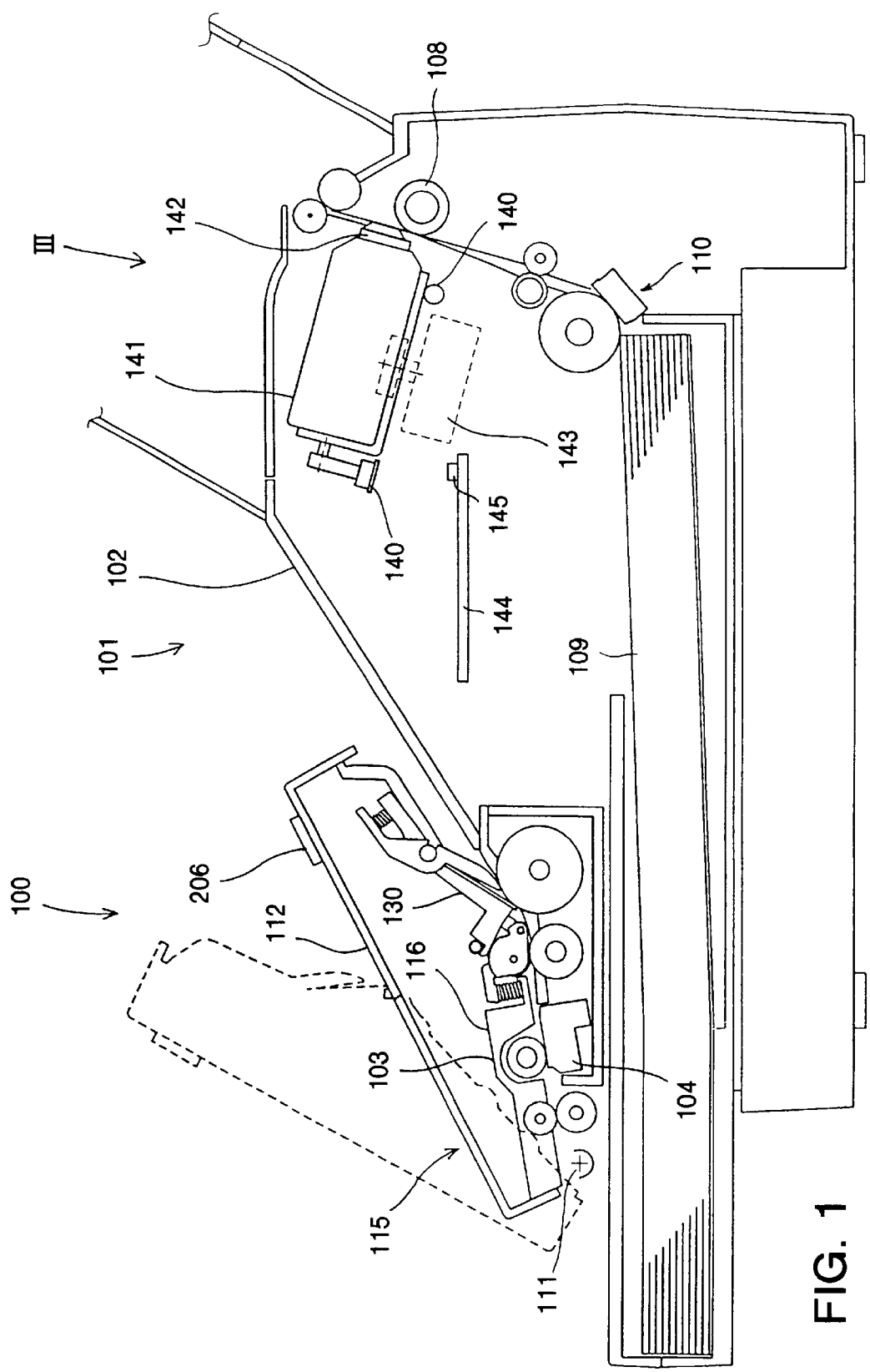

The present invention concerns, in general terms, a device and a method for detecting or measuring a quantity of product remaining in a reserve of product designed to be subjected to a series of driving movements.

More particularly, the present invention relates to a device and a method for detecting or measuring a quantity of product remaining in a reserve of consumable product arranged in a cartridge forming part of a printing device. It also concerns a printing device, a computer, a photocopier and a facsimile machine incorporating such a device.

It is known that the applicant has, for several years, used a so-called "bubble jet" method of printing. In global terms, this method consists of projecting liquid ink drops onto the paper. The liquid ink is contained in a reserve arranged in a cartridge associated with a printing head. The printing head includes a plurality of aligned nozzles, the function of each nozzle being to eject ink designed to product a dot on the sheet. During the printing process, the cartridge and printing head sweep over the width of the sheet, whilst the latter advances step by step over its length. To this end, the cartridge and the printing head are driven in their translational movement by a driving device including in this case an electric motor controlled by control means. These control means are, in general terms, adapted to transmit electrical signals to the motor to cause the assembly to move, drive it at the required translational speed and stop it. This technology is the object of several patents, amongst them the document EP-A-0 588 616 A1, whose description is incorporated herein.

In general terms, the problem underlying the present invention is that of knowing the quantity of consumable product in a reserve subjected to a movement. A particular application of the invention concerns the measurement, in a facsimile machine, of the quantity of ink still available. This is because it is important for the user of a facsimile machine to know in time that the reserve is about to be emptied.

It is therefore desirable to have available a means of measuring the quantity of this consumable product, referred to below for the sake of clarity as "ink", regardless of whether it is in solid, liquid, gaseous or powder (toner) form.

In expensive devices, an ink level detector is incorporated into the cartridge, but this solution cannot be adapted to low-priced devices owing to the fact that the cost of each detector is itself prohibitive for this application.

The objective of the present invention is consequently to enable a quantity of product remaining in a reserve arranged in a cartridge to be detected or measured, without using detectors incorporated into the latter.

The inventors also set themselves the objective of performing this detection or measurement without modifying the mechanical structure of the cartridge and/or printing device as marketed at the present time or, at the very least, modifying the printing device as little as possible.

The present invention achieves these objectives since it relates first of all to a device for detecting the quantity of a product remaining in a reservoir subjected, in the course of its utilization, to a driving movement by a drive device controlled by control means adapted to send to the drive device reference signals representing required accelerations or decelerations and/or speed, the drive device being able to confer on the reservoir, for a predetermined quantity of product in the reservoir, a predetermined maximum acceleration or deceleration and/or speed, characterized in that it includes testing means which, on the one hand, act on the control means in order for the latter to send test reference signals representing an acceleration or deceleration and/or a speed greater respectively than the said predetermined maximum acceleration or deceleration and/or speed and, on the other hand, detect at least one physical effect induced by the said test signals.

The invention also concerns a method for the detection of a quantity of product remaining in a reservoir subjected, in the course of its utilization, to a driving movement by a drive device controlled by control means adapted to produce for the drive device reference signals representing required accelerations or decelerations and/or speed, the drive device being able to confer on the reservoir, for a predetermined quantity of product in the reservoir, a predetermined maximum acceleration or deceleration and/or speed, a method characterized in that it comprises a testing phase in the course of which:

the control means are acted upon in order for the latter to send a testing signal representing an acceleration or deceleration and/or a speed greater respectively than the said predetermined maximum acceleration or deceleration and/or speed and, at least one physical effect induced by the said test reference signal is detected.

In a preferred application, the reserve of product is a reserve of liquid ink forming part of an ink cartridge. However, the scope of the invention is not limited to liquid inks, but encompasses the detection or the measurement of a remaining quantity of product, whether it be in solid, liquid, gaseous or powder form, in a reserve of the said product. In particular, printers using solid inks, whether in the form of powder, also called "toner", or in the form of a stick, can advantageously incorporate the device which is the object of the present invention. By virtue of these arrangements, the device and method achieve the objectives assigned to them above.

To each quantity of product remaining in the reserve, there corresponds an acceleration, a deceleration and/or a maximum speed which the driving device is able to confer on the reserve.

During the testing phase, by causing the transmission of reference signals representing performances beyond normal operating conditions of the drive device, here, in the example illustrated in the figures, an electric motor, several physical effects are generated. These physical effects can, for example, be a rise in the temperature and/or an abnormal movement of the liquid reserve, that is to say they do not correspond to the theoretical movement relative to the reference value. By detecting or measuring at least one of these physical effects, the invention makes it possible to detect that a threshold relating to total mass in movement, and consequently to the quantity of product remaining in the reserve, has been passed.

The value of the physical effect relating to each signal can easily have been determined previously for a predetermined quantity of remaining product in the product reserve and be stored in the memory of movement-control logic circuits, with the associated measurement value.

Consequently, the present invention requires, in order to be implemented, only a modification to the control program of the motor to implement the steps of the method defined above and, optionally, a detector detecting the said physical effect. It will thus be observed that the invention, as defined succinctly above, enables its objectives to be attained whilst avoiding the need to carry out substantial modifications of a mechanical nature, whether to the cartridge or to the head driving device.

The present invention thus also makes it possible, through the regular implementation of testing or measurement phases (notably outside the phases of reception of documents in the case of a facsimile machine or between the phases of printing of each page), to determine whether or not the minimum quantity of ink is reached in the cartridge reserve. The user can then be alerted when this minimum quantity is reached and proceed with the replacement of the cartridge.

According to a preferred aspect of the present invention, the said physical effect detected is a movement, and the testing means are adapted to detect any movement of the said reservoir following the sending of the said test signals.

This aspect of the invention is particularly advantageous in that the physical effect, movement in this case, can be detected or measured by means which are particularly simple to implement and, in a preferred embodiment, already in existence in the bubble-jet printing device. Thus, in this embodiment, no dedicated testing or measurement means need to be added to the existing printing device, the only modification required being that of the motor control program.

This is because the printing device, and more particularly the electric motor, are sized at the outset so that, at full load, the head assembly can reach its nominal translational speed in a relatively short predetermined time, corresponding to a so-called "nominal" acceleration. In reality, the driving device and motor are substantially oversized, to allow, with the ink reserve fully loaded, an acceleration called "maximum acceleration at full load", substantially greater than the nominal acceleration.

This aspect of the present invention therefore starts from the principle according to which, when the ink reserve falls, the weight to be set in movement or stopped with each translation also falls, the driving device then being able to accelerate or decelerate this weight beyond the maximum acceleration or deceleration at full load.

The inventors therefore conceived, in accordance with this aspect of the invention, of controlling a succession of accelerations or decelerations and/or speeds of the motor beyond the said maximum acceleration or deceleration and/or speed at full load and measuring the movement following the action of the measurement signals.

Consequently, given the weight of the head assembly, when the reserve has a quantity of ink corresponding to each of the quantities on the measurement scale (the "quantity to be detected"), it is possible to determine a movement value corresponding thereto.

In practice, notably using a stepping motor as the electric motor, an acceleration substantially greater than the maximum measurement acceleration has the effect of making the motor "lose steps", the difference between the "electronic" position (that is to say that corresponding to the successive references) of the motor and the "mechanical" position (that is to say its actual position) thereof being variable according to the weight of product to be measured and according to the said acceleration.

What has just been explained in relation to a measurement acceleration beyond the maximum acceleration at full load holds true if reference values corresponding to measurement decelerations greater than those theoretically possible are used.

In the preferred embodiment, the measurement of any movement of the printing head is performed by means of a device for measuring the position thereof incorporated in the driving device for printing.

This testing or measurement device is designed, during normal operation, to detect the passage of the printing head through a reference position. It is also used in the preferred embodiment of the present invention to measure any difference between the electronic position of the printing head and its mechanical position following the measurement accelerations. This information is also processed, by the control unit incorporated in the electronics of the printing device, by the implementation of a measurement program.

According to particular characteristics of the invention, the device includes a temperature sensor adapted to transmit a temperature signal representing the temperature surrounding the drive device and the testing means detect on the one hand the said physical effect induced by the said testing signals and on the other hand the said temperature signal.

According to a first particular variant, the testing means includes a means of comparison between the temperature represented by the temperature signal and a predetermined temperature value and the testing means act on the control means only if the temperature signal represents a temperature below the said predetermined value.

By virtue of these arrangements, there is no risk that the measurement of the physical effect induced will vary under the effect of an excessively high temperature. Furthermore, where the measurement signal gives rise to heating, by avoiding transmitting this measurement signal when the temperature surrounding the drive device is above the predetermined value, damage to the drive device is avoided.

According to another variant, the testing means is adapted to process the signals representing the said physical effect by taking into account a signal representing the said temperature surrounding the drive device.

By virtue of these characteristics, the measurement of the quantity of product takes account of the physical effect induced and its variation with the temperature surrounding the drive device. The precision of the measurement is thereby improved.

According to a second aspect of the present invention, the said physical effect detected is heating, while the testing means are adapted to detect heating of the drive device due to the transmission of the said testing signals.

By virtue of these arrangements, measurement of the quantity uses only a single signal representing both the initial temperature surrounding the drive device and the heating induced by the measurement signal.

According to particular characteristics, the testing means includes a means of comparison between the level of the signal representing the physical effect induced corresponding to the quantity of product remaining in the said reservoir and a predetermined value, and the testing means successively modify the testing signal each time the level of the said signal passes beyond the said predetermined value.

By virtue of these arrangements, when the signal level representing the effect induced becomes too weak for measurement of the quantity to be reliable, the measurement signal is modified so that the said representative signal is increased.

The invention also relates to a printer, a facsimile machine, a photocopier and a computer including the device disclosed succinctly above.

Figure 2:
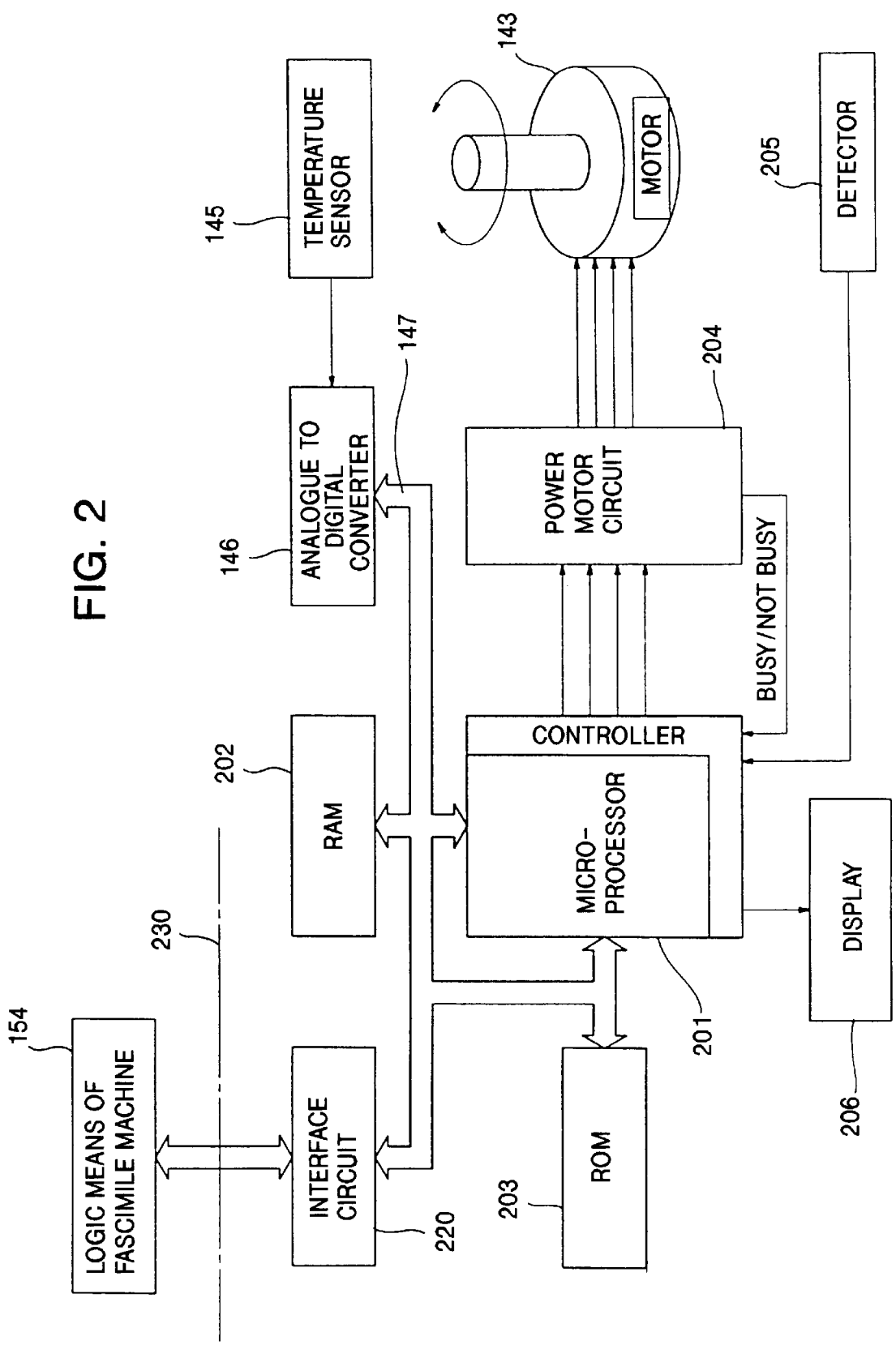
Figure 3:
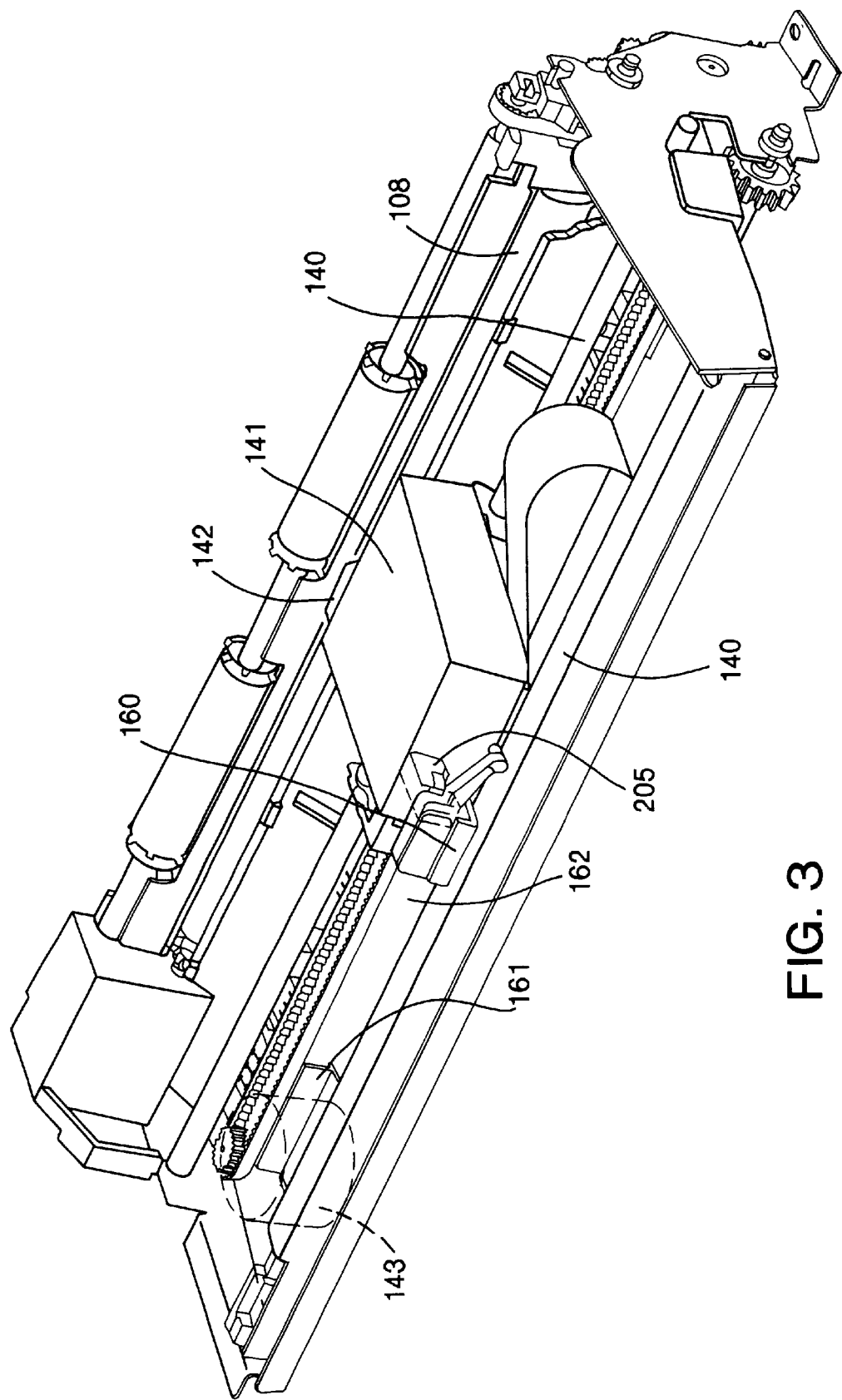
Figure 4:
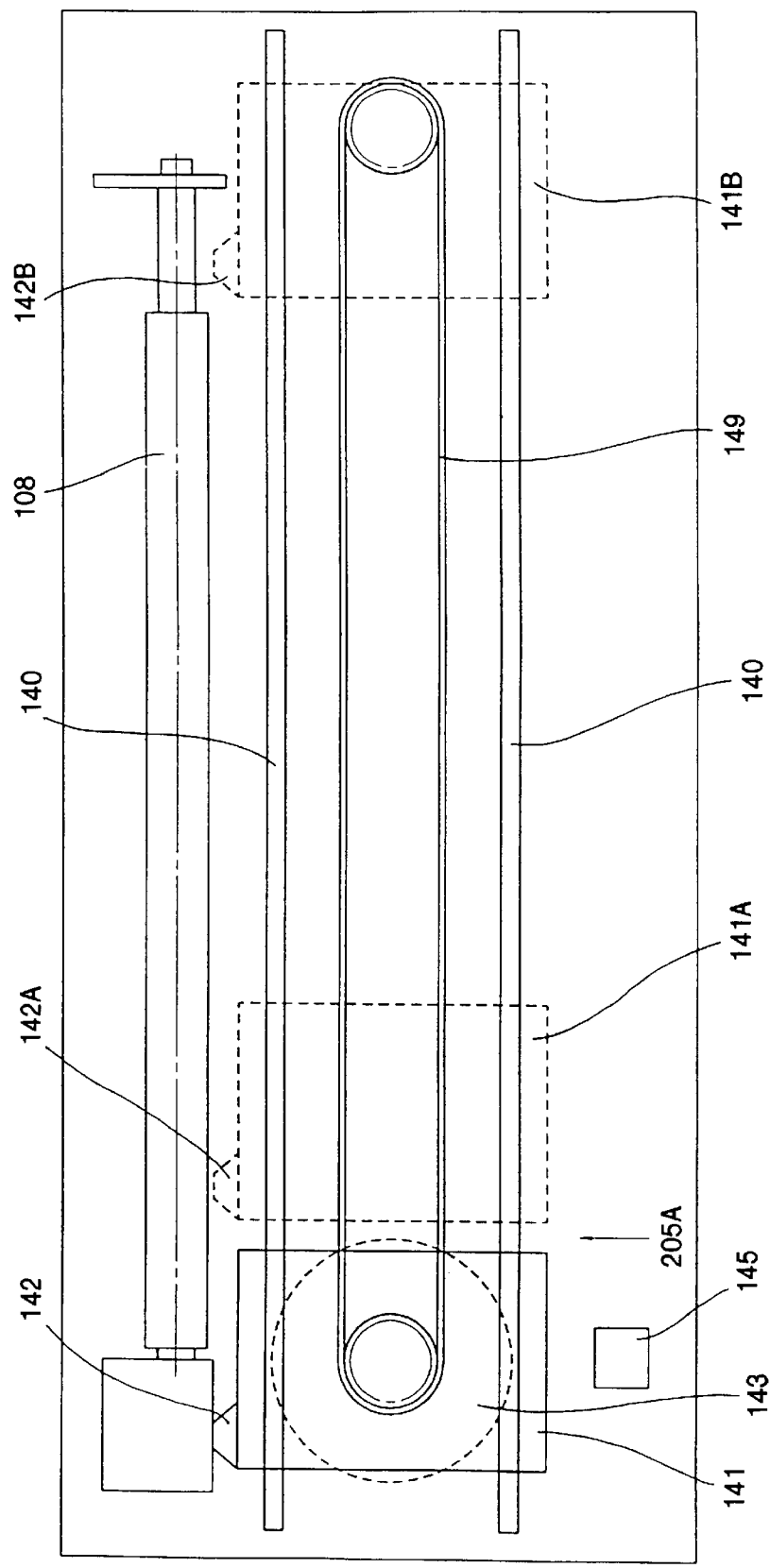
Figure 5:
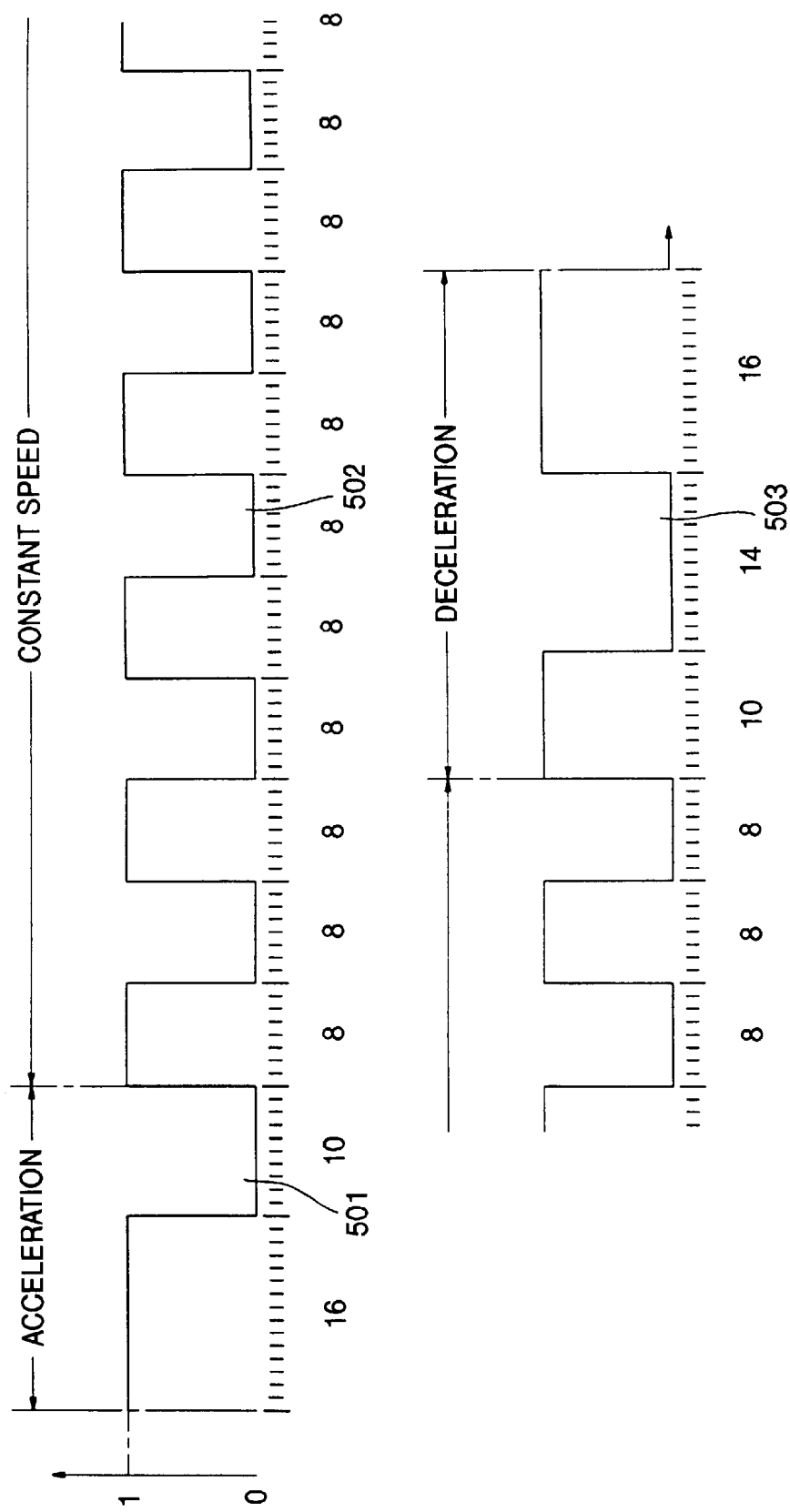
Figure 6:
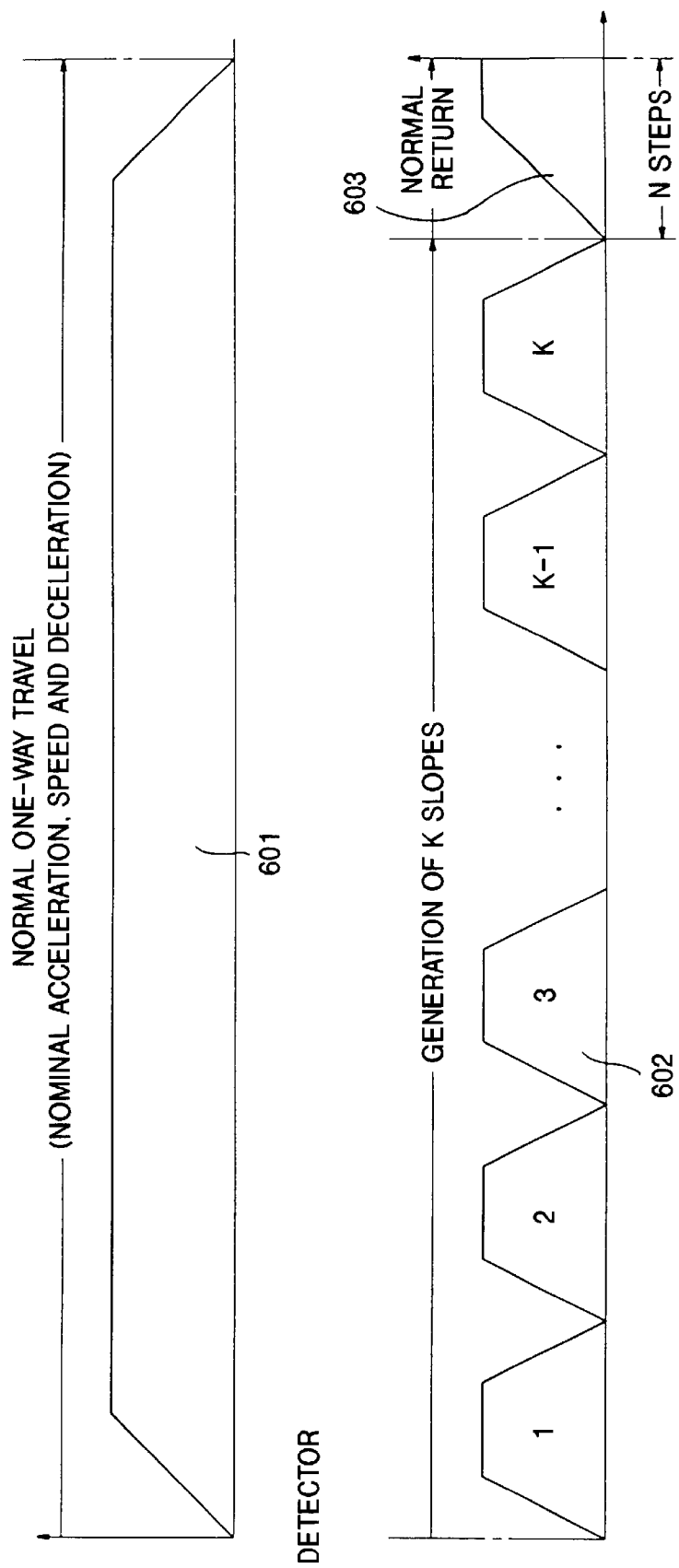
Figure 7A:
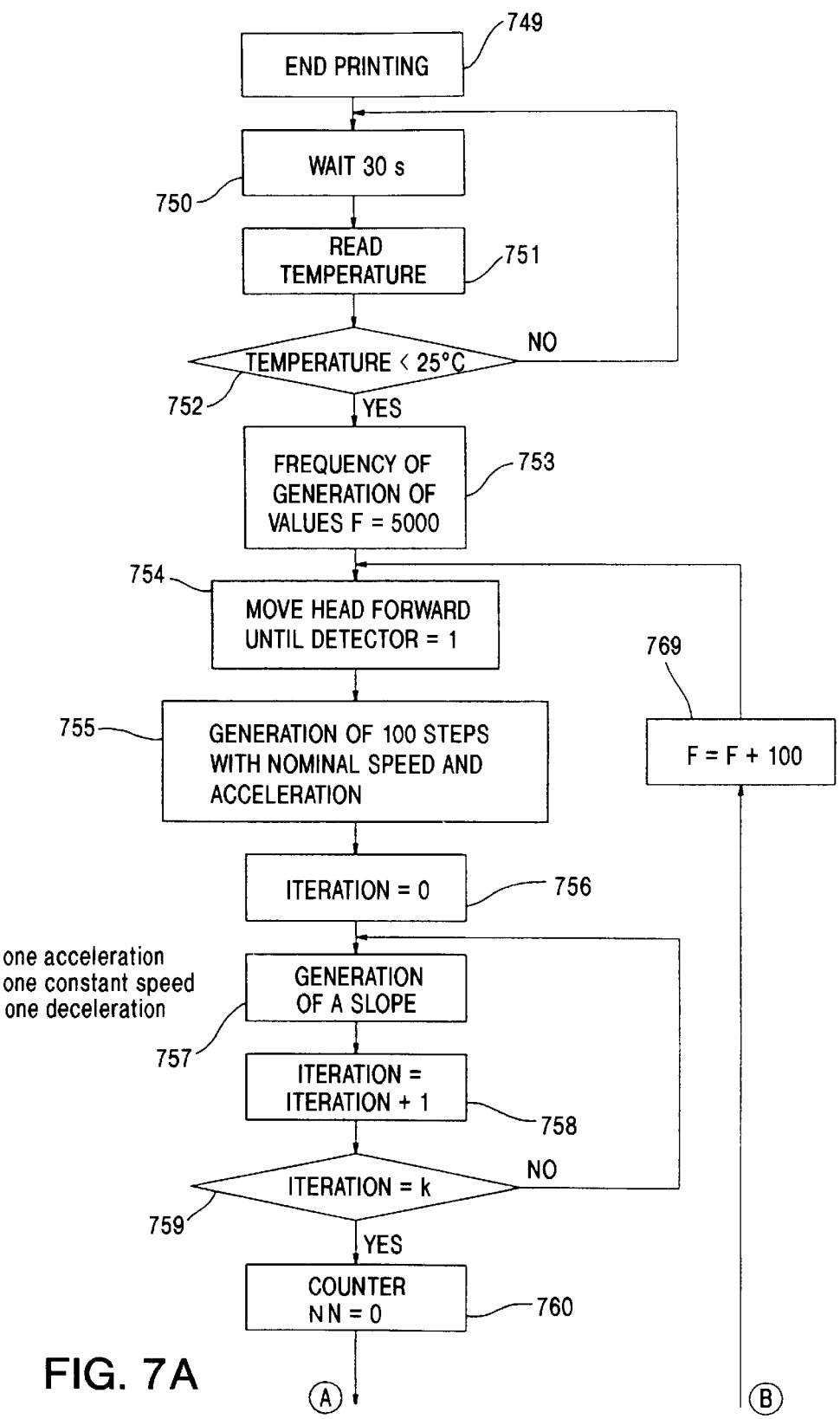
Figure 7B:
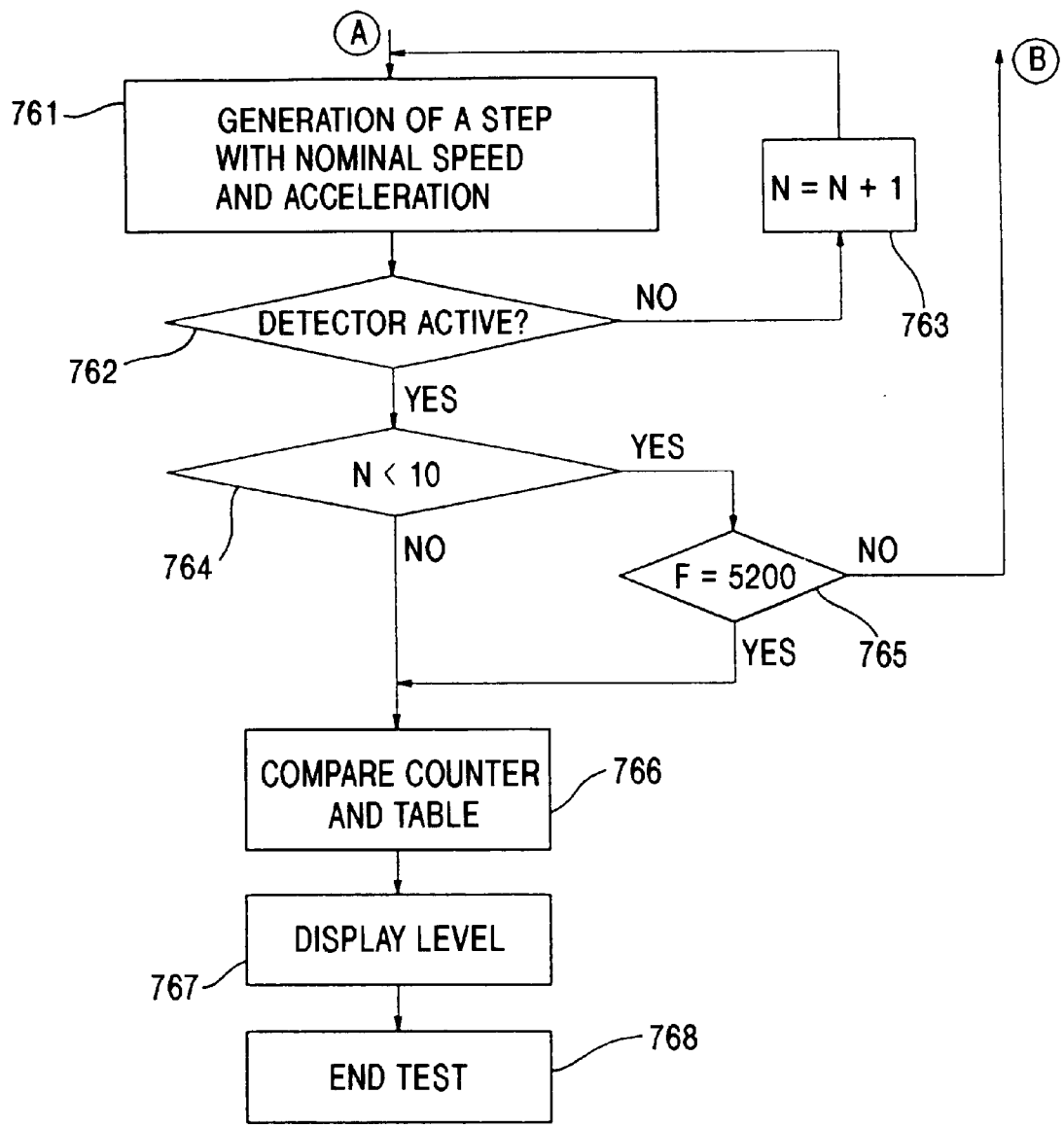
Figure 8:
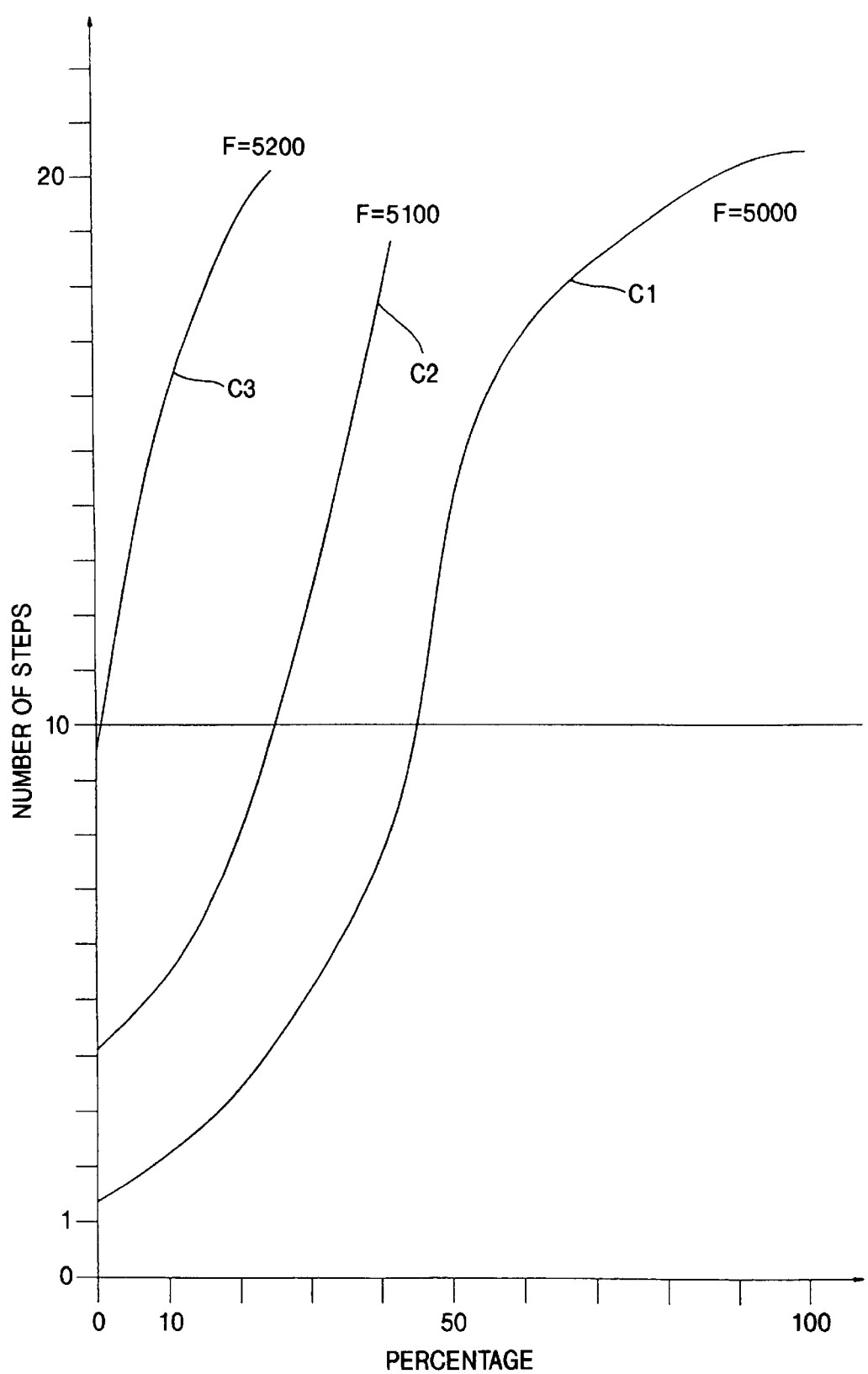

The characteristics and advantages of the invention will, moreover, emerge from the description which follows with reference to the accompanying drawings in which:

FIG. 1 is a diagrammatic view of a facsimile machine implementing the invention, FIG. 2 is a block diagram illustrating the electronic circuit controlling a motor used in a facsimile machine illustrated in FIG. 1, FIG. 3 is a simplified perspective view of the top of the printing device of the facsimile machine in FIG. 1, FIG. 4 is a highly simplified explanatory diagrammatic view, in the direction of the arrow III in FIG. 1, of the printing device, FIG. 5 is a timing diagram of one of the phases of the stepping motor, FIG. 6 depicts a timing diagram of the speed of a cartridge of the facsimile machine presented in relation to FIG. 1, a cartridge containing the product whose remaining quantity is measured, FIGS. 7A and 7B are two parts of a flow diagram of a program recorded in the read-only memory of the circuit in FIG. 2, and FIG. 8 depicts response curves of movement detection means presented in conjunction with FIGS. 2 and 3, according to a quantity of product remaining in the cartridge presented in conjunction with FIG. 6.

FIG. 1 depicts, diagrammatically, a facsimile machine implementing the invention. This facsimile machine, shown under the reference numeral 100, includes in a conventional fashion:

- an area 101 for temporary storage of documents to be sent, including a plate 102 on which the documents are stacked,
- a reading device area 103 essentially having a sensor 104 and a carrier roller 105,
- a paper storage tray 109 arranged upstream of a device 110 for conveying paper towards a printing device described hereinafter, and
- a sheet feeding device 130 designed to transfer one by one the sheets stacked on the support plate 102 to the reading device 103.

In the facsimile machine 100 illustrated in cross section in FIG. 1, part of the reading device (the roller 105) and of the feeding device 130 is arranged in a casing 115 pivoting about an axis depicted diagrammatically under the reference numeral 111. On the top of the casing 115 there is arranged the control panel 112 of the facsimile machine. In FIG. 1, the casing 115 is illustrated with solid lines in its closed position, in which the facsimile machine is operational. It is illustrated with dotted lines in its open position in which the user is able to intervene in the event of a paper jam, to unblock the facsimile machine.

The casing 115 includes, firstly, a frame 116 bearing various components of the reading device 103 and feeding device 130, and a cover 117 bearing the control panel 112 on which there is arranged a display 206.

This facsimile machine 100 also includes, in a conventional fashion, a printing device for documents received, illustrated diagrammatically in FIG. 1 under the reference 150. This printing device is a "bubble jet" printing device.

In FIG. 1, only the following have been illustrated:

- the cartridge 141, this being fixed to a printing head 142. The cartridge 141 also incorporates an ink reserve. When empty, the total weight of the cartridge assembly and of the head is around 37 g. When the ink reserve is full, this total weight rises to around 60 g.,
- the motor 143 for driving the printing head and ink cartridge, and
- a guide and carrier roller 108 designed to cooperate with the printing device to enable documents received to be printed.

The printed circuit 144 including the electronic control components for the printing device is illustrated highly diagrammatically.

All these arrangements are conventional and as such well known to experts. These devices and arrangements will not, consequently, be described here in further detail, all the more so since they do not concern the invention proper. It should, in any case, be noted that the mechanical structure of the facsimile machine 100 illustrated in FIG. 1 and in which the invention is used is that of the facsimile machine incorporating a printer as described in the document EP-A-0 588 616 A1 and marketed by CANON INC, the facsimile machine 100 in accordance with the invention being distinguished for the after essentially by its operating software, which enables the invention to be used. Reference should therefore be made to this document for any information relating to the structure and operation of the printing mechanism and of the cartridge.

A temperature sensor 145, positioned mechanically close to the driving motor 143 for the printing head and ink cartridge, is also illustrated highly diagrammatically.

The block diagram of an electronic control circuit incorporating the particular embodiment of the testing or measurement device used in the facsimile machine illustrated in FIG. 1 will now be described in conjunction with FIG. 2. This device includes, connected to an electronic bus 147:

- through an interface circuit 220, a facsimile machine logic means 154 designed to decode the signals transmitting data on telephone channels,
- a printer microprocessor 201,
- a random access memory RAM 202, in which the variables and the temporary values of use in the operation of the device are recorded,
- a read-only memory ROM 203, in which there are recorded, on the one hand, the programs run by the printer microprocessor 201 and, on the other hand, the tables of correspondence between a physical effect and a quantity of product in the cartridge (see description with regard to FIGS. 7 and 8). In particular, the read-only memory 203 includes a test or measurement program which will be described in conjunction with FIG. 7 and which constitutes in this case an example of a testing or measurement means within the meaning of the present invention, and
- the temperature sensor 145, through an analogue to digital converter 146, which transmits on the bus 147 digital signals representing the temperature-surrounding the temperature sensor 145;

and, connected directly to the printer microprocessor 201:

- a power circuit 204. This power circuit receives four low- power logic control signals coming from the printer microprocessor 201 and amplifies them in order to apply them with high power to the four winding inputs of the stepping motor 143,
- a display 206, and
- an optical detector 205.

The printer microprocessor 201, the random access memory 202 and the power circuit 204 here constitute an example of a control means within the meaning of the present invention which are adapted to transmit a reference signal to the motor (in this case to the four winding inputs of the motor 143). These reference signals represent the acceleration or deceleration required of the motor 143, expressed in steps per second per second. They can also represent a rotation speed required of the motor, expressed in steps per second.

The optical detector 205 is presented in conjunction with FIG. 3. The motor 143 is, in this embodiment, an electric motor of the bipolar stepping type.

In this figure, other elements not necessary for the invention to be understood have not been depicted, such as the electrical supply or clocks. The electronic circuits directly affecting the operation of the facsimile machine have simply been depicted in the form of an interface circuit 220 and logic means 154. This circuit and these logic means are well known to experts.

In FIG. 3, which is a plan view in perspective of the printing device of the facsimile machine in FIG. 1, the following can be seen:

- the roller 108,
- the rails 140 for guiding the carriage 160 which carries the cartridge 141 and the printing head 142,
- the motor 143, in dotted lines,
- a belt device 149 enabling the carriage 160, cartridge 141 and printing head 142 to be driven in their reciprocating translational movement,
- the optical position detector, whose reference numeral is 205. This optical detector 205 is borne by the carriage 160 and cooperates with an opaque wall 161 fixed to the frame 162. It includes a photoelectric sensor and a light emitting diode directed towards the photoelectric sensor but mechanically separated therefrom by a groove oriented downwards and parallel to the direction of movement of the carriage 160. When the detector 205 is not in the reference position 205A, the light beam generated by the light emitting diode passes through this groove and is received by the photoelectric sensor. The opaque wall fixed to the frame 162 is vertical and oriented upwards and parallel to the groove. It is interposed between the said diode and the said sensor only when the detector 205 is in the reference position 205A. The output signal of the photoelectric sensor therefore directly represents the position of the cartridge 141 and of the printing head 142.

In FIG. 4, which is a diagrammatic plan view of the printing device, the printing head 142 and its associated cartridge 141 are illustrated in solid lines in a so-called "standby" position, in which the printing head does not straddle the roller 108 (the length of the roller representing substantially the width of the paper able to be admitted into the printer). In FIG. 4, it will be observed that the temperature sensor 145 is mechanically close to the motor 143 so that the temperature that it senses is that of the environment of the motor 143.

The printing head and associated cartridge have been depicted in dotted lines under the reference numerals 142a and 141a in their so-called "reference" position, in which the printing of the paper can actually commence, and under the references 142b and 141b respectively, in the "end of travel" position of the head, in which the latter is no longer opposite the roller 108 and the sheet of paper to be printed. The number of steps of the stepping motor 143, to cause the printing head to move from the position 142a to the position 142b, is greater than 100.

During printing, the assembly consisting of the head 142 and cartridge 141 is driven in a reciprocating movement between the positions 142a and 142b. The reference position of the detector 205 is moreover illustrated in FIG. 4 by an arrow 205A.

Outside the measurement phases, the position of the printing head 142 and of the cartridge 141, between the reference position 142a and the end of travel position 142b, is still known here with precision, since it corresponds biuniquely to the number of steps made by the motor from the position of the motor corresponding to the reference position 142a of the head.

In the embodiment described here, the user is able to know the quantity of ink present in the reserve of the cartridge. This is because each quantity of ink corresponds, when the printing device prints sheets of average blackness, to the number of pages which can still be transmitted before changing the cartridge. For example, the total weight of the head 142 and of the reserve 141 associated with it and 25% full is 43 g, which, in the worst case scenario, still enables at least five sheets to be printed.

In order to allow this measurement, the present invention detects at least one effect caused by a succession of measurement references transmitted to the motor and each controlling the latter beyond its normal conditions of use. Here, the physical effect detected is the movement of the head 142.

In this embodiment, the stepping motor 143 operates at a "nominal speed" of 350 steps per second. Furthermore, the motor 143 and the mechanics associated with it are so designed that the motor is able to accelerate the printing head 142 and cartridge 141 from a nil speed to a speed of 350 steps per second in a period of 50 milliseconds, when the ink reserve is full ("nominal acceleration").

In reality, the safety margins provided are such that, at full load, the motor could accelerate the assembly in a period of around 30 milliseconds, so that it attains a speed of 350 steps per second ("maximum acceleration at full load").

FIG. 5 depicts, on two successive lines, a timing diagram of one of the phases of the stepping motor 143, it being known that the other phases of this motor are derived from the one shown by a phase shift, well known to experts in motors. On the X-axis, the time is depicted with a constant scale on both lines. On the Y-axis, the amplitude of the motor control signal is depicted for the phase in question. For each movement of the printing head controlled by the printer microprocessor 201, three time intervals correspond respectively:

- to an acceleration, time interval 501, during which the rectangular signals are initially of long duration, and then shorter and shorter;
- to a constant speed, time interval 502, during which the control signal is periodic;
- to a deceleration, time interval 503, during which the rectangular signals initially have a short duration and then increasingly long durations.

To a given speed in the time interval 502, there corresponds a given frequency of the periodic control signal. For this frequency, the measurement signal corresponds to an acceleration which is greater, the shorter the time interval 501.

Conversely, for a given period of the acceleration time interval 501, the measurement signal corresponds to an acceleration which is greater, the higher the final frequency.

In the embodiment described and depicted, it is the final frequency which is varied for acceleration time intervals of constant duration.

In FIG. 6, there is depicted a timing diagram of control signals corresponding to a measurement of the quantity of ink remaining in the cartridge, on two lines whose X-axis is the passage of time at a constant scale.

In FIG. 6, the Y-axis represents the instantaneous speed of the cartridge. The time interval 601 corresponds to a movement of the printing head and of the cartridge starting from the position in which the optical detector 205 senses their presence to a position towards the centre of the sheet to be printed, with a nominal acceleration and speed. The time interval 602 corresponds to a number k of acceleration slopes greater than the maximum acceleration at full load.

These accelerations are each effected in the direction of the return of the printing head and of the cartridge to their starting position at the start of the time interval 601.

The total number of steps demanded during the succession of acceleration slopes in the time interval 602 is less than or equal to the number of steps demanded during the time interval 601. Furthermore, the successive measurement accelerations have, according to the weight of ink present in the cartridge, been able to cause slips in the stepping motor, in which case movement steps have been lost. In this way, at the end of the time interval 602, the printing head and cartridge have not passed beyond their starting point at the start of the time interval 601.

During the time interval 603, the motor 143 is controlled with a nominal acceleration (350 steps per second in 50 milliseconds) to move the printing head and cartridge to the said starting position and the steps effected before reaching this starting position are counted, as described in relation to FIGS. 7A and 7B. This number of steps represents the weight of product, ink in this case, present in the reserve of the cartridge.

The accelerations of all the slopes in the time interval 602 are equal and the slippages due to all these acceleration slopes are accumulated and thus avoid the errors which too short a period can produce. This approach requires knowledge of the approximate quantity of product present so that the acceleration used corresponds to a value close to that whose passing is sought.

It should be noted, in this regard, that a second method consists of applying different accelerations between the slopes, where some slopes may not correspond to any slipping and others to heavy slipping. This manner of measurement has the advantage that it is not necessary to have approximate knowledge of the quantity of product before measuring it, but has the drawback that the motor heats up.

The flow diagram presented in FIG. 7 corresponds to the first manner of performing the measurement according to the invention.

In conjunction with FIG. 7, the operation of the device chosen and depicted in FIGS. 1 to 6, together with a preferred embodiment of the method according to the invention, will now be described.

First of all, it should be noted that the printing device illustrated in FIGS. 1 to 6 operates in a conventional fashion, that is to say as described in the aforementioned document EP-A-0 588 616 A1. Similarly, the facsimile machine 100 operates in a conventional fashion for a facsimile machine. These operations are thus well known to experts and will not be detailed here.

It should, however, be noted that, in accordance with the method and device of the invention, the control programs loaded in the read-only memory ROM 203 are modified to include a program for measuring the quantity of ink, which periodically controls the running of a measurement phase, as described hereinafter.

The flow diagram in FIGS. 7A and 7B illustrates, diagrammatically, the progress of the operations in the measurement phase and the structure of the measurement program which are recorded in the read-only memory 203. First of all, in this embodiment, a measurement phase is started at the end of the printing of each page, operation 749, FIG. 7A, but it is interrupted if another page is to be printed.

At the start of the measurement phase, operation 750, an operation of waiting for a period of thirty seconds is performed, designed to allow the balancing of the temperatures between the motor 143 and the environment of the temperature sensor 145. Then the operation 751 corresponds to the reading of the digital output of the analogue to digital converter by the processor, an output whose logic state represents the temperature sensed by the temperature sensor 145. The test 752 determines whether or not the temperature read during the test 751 is less than or equal to 25° C. In the negative case, the processor 201 returns to the start of the waiting operation 750. Where the result of the test 752 is positive, the operation 753 consists of initialising to the value 5000 a variable F representing a frequency and stored in the random access memory RAM 202.

The operation 754 consists of positioning the printing head in front of the optical detector 205, according to known techniques. The operation 755 consists of controlling the movement of the printing head by 100 steps of the stepping motor 143 towards the centre of the sheet to be printed, with a nominal acceleration (350 steps per second in 50 milliseconds) to avoid slipping of the motor 143. The operation 755 concerns the interval of time 601 depicted in FIG. 6.

The operation 756 initialises to 1 the value of an "iteration" variable stored in the random access memory RAM 202. The operation 757 generates an acceleration slope with an acceleration value greater than the "maximum acceleration at full load" described above, with a speed above the maximum speed at full load and with a deceleration below the maximum deceleration at full load, and corresponding to the maximum frequency equal to F. The operation 757 orients the movement of the printing head towards the optical detector 205.

The operation 758 consists of incrementing by one unit the value of the "iteration" variable. The test 759 determines whether or not the value of the "iteration" variable is above a predetermined value K. If the result of the test 759 is negative, the processor returns to the start of the operation 757. If the result of the test 759 is positive, the operation 760 consists of initialising a counter N stored in the random access memory RAM 202 at the value 0. The loop formed by the operations 757 and 758 and the test 759 concerns the interval of time 602 depicted in FIG. 6.

The operation 761 (FIG. 7B) then consists of moving the printing head forwards towards the position in which the optical detector 205 detects its presence, by moving it with a nominal acceleration (350 steps per second in 50 milliseconds). The test 762 determines whether or not the detector 205 has detected the presence of the printing head and has transmitted a presence logic signal to the printer microprocessor 201.

If the result of the test 762 is negative, the operation 763 increments by one unit the value of the counter N, then returns to the start of the operation 761. When the result of the test 763 is positive, this means that the time interval 603 depicted in FIG. 6 is over and that the value of the variable N is that of the total number of slippage steps of the motor during the time interval 602.

The test 764 then determines whether or not the value of the counter N is less than 10. If the result of the test 764 is positive, the test 765 determines whether or not the value of F is equal to 5200. If the result of the test 765 is negative, the operation 769 (FIG. 7A) consists of incrementing by 100 the value of the variable F. and then returning to the start of the operation 754. This is because, if N is less than 10, the result of the measurement is uncertain and a further measurement, with a higher value for F up to 5200, is essential in order to determine the quantity of ink remaining in the cartridge. If the value of N is less than 10 but the frequency F is greater than 5200, this means that the cartridge is substantially empty.

If the result of the test 764 is negative or if the result of the test 765 is positive, the operation 766 consists of comparing the value of N with the curve corresponding to the frequency F, in FIG. 8, by using a matrix table in which each column corresponds to one of the three values of F and each row to one of the different possible values of N, a table stored in the read-only memory ROM 203 and a representation of which is given here, under the title "Table 1".

TABLE 1

|        | F = 5000 | F = 5100 | F = 5200 |
|--------|----------|----------|----------|
| N = 1  | 0        | /        | /        |
| N = 2  | 8        | /        | /        |
| N = 3  | 18       | /        | /        |
| N = 4  | 24       | /        | /        |
| N = 5  | 30       | 8        | /        |
| N = 6  | 33       | 13       | /        |
| N = 7  | 39       | 16       | /        |
| N = 8  | 41       | 20       | /        |
| N = 9  | 43       | 22       | /        |
| N = 10 | 45       | 24       | 0        |
| N = 11 | 47       | 26       | 2        |
| N = 12 | 49       | 28       | 4        |
| N = 13 | 51       | 30       | 6        |
| N = 14 | 53       | 32       | 8        |
| N = 15 | 55       | 34       | 10       |
| N = 16 | 57       | 36       | 13       |
| N = 17 | 60       | 38       | 16       |
| N = 18 | 68       | 40       | 17       |
| N = 19 | 78       | 41       | 22       |
| N = 20 | 100      | 43       | 25       |

This is because, as the printing head and cartridge assembly produces a slipping of the stepping motor which is variable according to the weight of this assembly and with the controlled measurement acceleration, the use of the table makes it possible to correlate this slippage, in terms of the number of steps lost, this acceleration, corresponding to the frequency F, and the weight of the said assembly and, consequently, the ink in the reserve of the cartridge.

In a simplified embodiment, the operation 766 consists of comparing the value of N with a predetermined number, for example the number zero, the result being a binary number representing the presence or absence of said slippage.

The operation 767 consists of displaying the result read in Table 1 (or, in the simplified embodiment, the binary number), in the form of a measurement (or, ine the simplified embodiment, a test) of the ratio of the ink remaining to the ink .available for printing. Finally, the operation 768 consists of ending the measurement and returning to the facsimile mode operating program.

Thus, during the operations 757, 758 and 759, in accordance with a general characteristic of the invention, the control means are acted upon in order for them to transmit measurement signals representing an acceleration or deceleration and/or a speed greater respectively than the predetermined maximum acceleration or deceleration and/or speed at full load. Then, in accordance with the invention, at least one physical effect produced by the said measurement reference is detected.

In this embodiment, the said measurement reference relates to a slipping of the motor moving the reserve and this slippage is detected. Thus the control means (that is to say the printer microprocessor 201 connected to the random access memory 202 and the power amplifier 204) transmit measurement signals to the motor 143 representing accelerations above the maximum acceleration at full load. In practical terms, the measurement signal sent to the motor controls the movement thereof by 10 steps (1 for acceleration, 7 for the constant speed and 2 for deceleration) with an acceleration enabling a speed of 312 steps per second to be attained in an acceleration period of 5.2 milliseconds, where F=5000, by 10 steps (1 for acceleration, 7 for the constant speed and 2 for deceleration) with an acceleration enabling a speed of 319 steps per second to be attained in a period of 5.1 milliseconds, where F=5100, and by 10 steps (1 for acceleration, 7 for the constant speed and 2 for deceleration) with an acceleration enabling a speed of 325 steps per second to be attained in a period of 5.0 milliseconds, where F=5200.

FIG. 8 depicts, for a given ambient temperature (25° C. in this case), the curves representing on the X-axis respectively the values of the variable N. for frequency values of F equal to 5000 (curve C1), 5100 (curve C2) and 5200 (curve C3), according to, on the Y-axis, the percentage ratios of ink remaining in the reserve to the quantity of ink available when this reserve is full. Where N is below 10, the measurement is uncertain, except for F=5200. Where N is greater than or equal to 10, the curve corresponding to F=5000 is reliable for percentage values between 40 and 100 percent, the curve corresponding to F=5100 is usable for percentage values between 20 and 40 percent and the curve corresponding to F=5200 is usable for percentage values between 0 and 20 percent.

Looking at these three curves, it will be understood that the flow diagram presented in FIGS. 7A and 7B enables the value of the percentage of ink remaining with respect to the ink corresponding to a full reserve to be measured precisely. In particular, the table marked Table 1 includes the values of the curves in FIG. 8, for each whole value of the number of slippage steps measured.

According to a preferred variant, the operating flow diagram of the device is different, to take account of the value of the temperature sensed by the temperature sensor 145. According to this variant, the correspondence table stored in the read-only memory ROM 203 corresponding to the correlation not only of a movement with a quantity of ink but to the correlation of a temperature and a movement with a quantity of ink. The correspondence table used in this variant includes as many columns as the speed and temperature pair envisaged and the choice of column, performed by the printer processor, takes account of the temperature measured by the temperature sensor 145. Still according to this variant, the test 752 of the temperature sensed by the temperature sensor 145 during the operation 751 is omitted and the comparison operation 766 uses both the said temperature and the counter to determine the value of the level of ink in the cartridge.

Of course, the present invention is not by any means limited to the embodiment chosen and depicted.

In particular, in addition to the operation presented above, two other embodiments are within easy reach of experts: one consisting of producing, with each measurement, the three series of accelerations corresponding to the values of F equal respectively to 5000, 5100 and 5200, and the other consisting of performing firstly only the acceleration series corresponding to the value F=5000, then, when the number N has fallen below 10, performing only the series of accelerations corresponding to the value F=5100, then, when the number N has again fallen below 10, performing only the series of accelerations corresponding to the value F=5200.

It has already been mentioned above that, instead of demanding a measurement acceleration, the logic means could demand a measurement deceleration. To this end, it is sufficient, for example, to demand, when the carriage 160 returns, at least one measurement deceleration beyond the maximum deceleration at theoretical full load, a deceleration able to cause the head assembly to stop in front of the detector 205.

Furthermore, physical effects other than the movement of the printing head 142 and cartridge 141 following the measurement reference can be detected. For example, where at least one measurement acceleration is demanded beyond the maximum acceleration at full load, each slippage step of the stepping motor 143 gives rise to a heating of the motor. This is because the mechanical energy corresponding to each step which is not performed during the slipping is dissipated in the form of heat energy.

The device using this aspect of the invention has the same structure and the same components as were presented above in conjunction with FIGS. 1 to 5. It uses the measurement signal presented in FIG. 6. The heating produced by this measurement signal is, according to this aspect of the invention, measured by the temperature sensor 145. This temperature sensor associated with the analogue to digital converter 146 supplies an item of digital information representing on the one hand the temperature at the start of the measurement signal and on the other hand a signal whose variation represents the heating.

According to this digital information and the measurement of the ambient temperature, measured outside the measurement or printing phases, the device according to this aspect of the invention measures the weight of ink in the reserve of the cartridge in the same manner as that presented above concerning the physical effect consisting of a movement. It should be noted, in this regard, that the heating produced by the measurement signal decreases according to the quantity of product remaining in the reserve.

According to a variant of this aspect of the invention, the temperature sensor consists of the internal resistance of the driving motor. This resistance effectively varies according to its temperature.

According to a last aspect of the present invention, the physical effect produced is a vibration, optionally in the audio frequency band. Each step of the stepping motor which is not produced, that is to say which "slips", corresponds to the emission of a mechanical wave by the drive motor. This mechanical wave can be sensed by an acoustic transducer, such as a microphone or a piezoelectric crystal for example, according to known techniques. Using a device such as that presented in FIGS. 1 to 5, with a measurement signal presented in FIG. 6, the mechanical energy of the vibrations, picked up by the transducer, is a decreasing function of the quantity of product remaining in the reserve.

What is claimed is:

1. A device for detecting a quantity of a product remaining in a reservoir subjected, during use of the product, to a driving movement by driving means for driving the reservoir, said device comprising:

control means for controlling the driving means in accordance with reference signals representing target movements of the driving means, said reference signals including at least one test reference signal; and detecting means for detecting position of the reservoir in response to the test reference signal;

wherein said test reference signal includes a first signal interval to move the reservoir a predetermined distance from a home position in a first direction, a second signal interval to move the reservoir in a predetermined number of accelerations and decelerations in a second direction opposite the first direction, and a third signal interval to move the reservoir back to the home position;

wherein the driving means undergoes slippage in response to the second signal interval, an amount of the slippage dependent upon the amount of product in the reservoir; and whereby the quantity of product remaining in the reservoir is detected from the detected position.

2. A device according to claim 1, wherein the reference signals include at least one test reference signal corresponding to an acceleration greater than a maximum acceleration that the driving means confers to the reservoir.

3. A device according to claim 1, wherein the reference signals include at least one test reference signal corresponding to a deceleration greater than a maximum deceleration that the driving means confers to the reservoir.

4. A device according to claim 1, wherein the reference signals include at least one test reference signal corresponding to a speed greater than a maximum speed that the driving means confers to the reservoir.

5. A device for detecting a quantity of a product remaining in a reservoir subjected, during use of the product, to a driving movement by driving means for driving the reservoir, said device comprising:

control means for controlling the driving means in accordance with reference signals representing target movements of the driving means, said reference signals including at least one test reference signal; and detecting means for detecting position of the reservoir in response to the test reference signal;

wherein said test reference signals correspond to target movements having an acceleration greater than a maximum acceleration during use of the product, a deceleration greater than a maximum deceleration during use of the product, and/or a speed greater than a maximum speed during use of the product; and whereby the quantity of product remaining in the reservoir is detected from the detected position.

6. A device according to claim 5, wherein the reference signals include at least one test reference signal corresponding to an acceleration greater than a maximum acceleration that the driving means confers to the reservoir.

7. A device according to claim 5, wherein the reference signals include at least one test reference signal corresponding to a deceleration greater than a maximum deceleration that the driving means confers to the reservoir.

8. A device according to claim 5, wherein the reference signals include at least one test reference signal corresponding to a speed greater than a maximum speed that the driving means confers to the reservoir.

9. A device for detecting a quantity of a product remaining in a reservoir subjected, during use of the product, to a driving movement by driving means for driving the reservoir, said device comprising:

control means for controlling the driving means in accordance with reference signals representing target movements of the driving means, said reference signals including at least one test reference signal; and detecting means for detecting position of the reservoir in response to the test reference signal;

whereby the quantity of product remaining in the reservoir is detected from the detected position.

10. A device according to claim 9, wherein the reference signals include at least one test reference signal corresponding to an acceleration greater than a maximum acceleration that the driving means confers to the reservoir.

11. A device according to claim 9, wherein the reference signals include at least one test reference signal corresponding to a deceleration greater than a maximum deceleration that the driving means confers to the reservoir.

12. A device according to claim 9, wherein the reference signals include at least one test reference signal corresponding to a speed greater than a maximum speed that the driving means confers to the reservoir.

13. A device according to claim 1, 2, 3, 4, 6, 7, 8, 10, 11 or 12, further comprising processing means for determining data representing the quantity of the product from a signal representing the position of the reservoir, and wherein the signal is supplied by said detecting means.

14. A device according to claim 1, 2, 3, 4, 6, 7, 8, 10, 11 or 12, wherein said detecting means detects any movement of the reservoir following the sending of at least one test reference signal.

15. A device according to claim 14, wherein said detecting means comprises an optical sensor for optical detection of the movement of the reservoir.

16. A device for detecting a quantity of a product remaining in a reservoir subjected, during use of the product, to a driving movement by driving means for driving the reservoir, said device comprising:
control means for controlling the driving means in accordance with reference signals representing target movements of the driving means, said reference signals including at least one test reference signal; and
detecting means for detecting a change in temperature caused by the driving means in response to the test reference signal,
whereby the quantity of product remaining in the reservoir is detected from the detected change in temperature.

17. A device according to claim 16, wherein the reference signals include at least one test reference signal corresponding to an acceleration greater than a maximum acceleration that the driving means confers to the reservoir.

18. A device according to claim 16, wherein the reference signals include at least one test reference signal corresponding to a deceleration greater than a maximum deceleration that the driving means confers to the reservoir.

19. A device according to claim 16, wherein the reference signals include at least one test reference signal corresponding to a speed greater than a maximum speed that the driving means confers to the reservoir.

20. A device according to claim 1, 2, 3, 4, 6, 7, 8, 10, 11, 12, 16, 17, 18 or 19, wherein the control means includes a printer processor.

21. A device according to claim 1, 2, 3, 4, 6, 7, 8, 10, 11 or 12, further comprising comparing means for comparing a level of a signal representing the position of the reservoir corresponding to the quantity of product remaining in the reservoir with a predetermined value, and wherein said testing means successively modifies the test reference signal taking into account a result of the comparison performed by said comparing means.

22. A device according to claim 1, 2, 3, 4, 6, 7, 8, 10, 11, 12, 16, 17, 18 or 19, wherein said product is a liquid.

23. A printer that includes a device according to claim 1, 2, 3, 4, 6, 7, 8, 10, 11, 12, 16, 17, 18 or 19.

24. A photocopier that includes a device according to claim 1, 2, 3, 4, 6, 7, 8, 10, 11, 12, 16, 17, 18 or 19.

25. A computer that includes a device according to claim 1, 2, 3, 4, 6, 7, 8, 10, 11, 12, 16, 17, 18 or 19.

26. A device according to claim 1, wherein the detecting means detects the position of the reservoir by determining the distance that the reservoir moves to get back to the home position in response to the third signal interval.

27. A device according to claim 1, 5 or 9, wherein said driving means is able to confer on the reservoir, for a given quantity of product in the reservoir, a maximum acceleration or deceleration and/or speed.

28. A device according to claim 27, further comprising testing means for causing said control means to send test reference signals representing an acceleration or deceleration and/or a speed greater than the maximum acceleration or deceleration and/or speed, respectively.

29. A device according to claim 1, 5 or 9, further comprising testing means for causing said control means to send test reference signals representing an acceleration or deceleration and/or a speed greater than a maximum acceleration or deceleration and/or speed, respectively, of said driving means.

30. A device for detecting a quantity of a product remaining in a reservoir subjected, during use of the product, to a driving movement by driving means for driving the reservoir, said device comprising:
control means for controlling the driving means in accordance with reference signals representing target movements of the driving means, said reference signals including at least one test reference signals corresponding to target movements out of a range of movements during use of the product; and
detecting means for detecting position of the reservoir in response to the test reference signals,
whereby the quantity of product remaining in the reservoir is detected from the detected position.

31. A device according to claim 1, 5, 9 or 30, wherein said test reference signals correspond to target movements out of a range of movements during use of the product.

32. A device according to claim 2, 3, 4, 6, 7, 8, 10, 11, or 12, further comprising a temperature sensor that transmits a temperature signal representing a temperature surrounding the driving means, and wherein said detecting means detects the position of the reservoir and detects the temperature signal.

33. A device according to claim 32, further comprising comparing means for comparing the temperature represented by the temperature signal with a predetermined temperature value, and wherein said control means sends at least one test reference signal only if the temperature signal represents a temperature below the predetermined temperature value.

34. A device according to claim 32, wherein further comprising processing means for processing the signal representing the position of the reservoir by taking into account the temperature signal representing the temperature surrounding the driving means.

35. A device according to claim 34, wherein the driving means is an electric motor.

36. A device according to claim 35, wherein the electric motor is a stepping motor.

37. A device according to claim 5, 9 or 30, wherein said test reference signals correspond to target movements having an acceleration greater than a maximum acceleration during use of the product, a deceleration greater than a maximum deceleration during use of the product, and/or a speed greater than a maximum speed during use of the product.

38. A device according to claim 16, 17, 18 or 19, further comprising processing means for determining data representing the quantity of the product from a signal representing the change in temperature, and wherein the signal is supplied by said detecting means.

39. A device according to claim 16, 17, 18 or 19, wherein the detecting means detects a change in temperature of the driving means.

40. A device according to claim 39, wherein said detecting means further comprises a temperature sensor that transmits a signal representing a temperature of the driving means.

41. A device according to claim 40, wherein the driving means is an electric motor.

42. A device according to claim 41, wherein the electric motor is a stepping motor.

43. A device according to claim 16, 17, 18 or 19, further comprising comparing means for comparing a level of a signal representing the change in temperature corresponding to the quantity of product remaining in the reservoir with a predetermined value, and wherein said testing means successively modifies the test reference signal taking into account a result of the comparison performed by said comparing means.

44. A device according to claim 16, wherein said driving means is able to confer on the reservoir, for a given quantity of product in the reservoir, a maximum acceleration or deceleration and/or speed.

45. A device according to claim 44, further comprising testing means for causing said control means to send test reference signals representing an acceleration or deceleration and/or a speed greater than the maximum acceleration or deceleration and/or speed, respectively.

46. A device according to claim 16, further comprising testing means for causing said control means to send test reference signals representing an acceleration or deceleration and/or a speed greater than a maximum acceleration or deceleration and/or speed, respectively, of said driving means.

47. A device for detecting a quantity of a product remaining in a reservoir according to claim 30, wherein said at least one test reference signals corresponding to target movements comprises a test reference signal having an acceleration greater than a maximum acceleration during use of the product, a deceleration greater than maximum deceleration during use of the product, and/or a speed greater than a maximum speed during use of the product.

48. A method for detection of a quantity of product remaining in a reservoir subjected, during use of the product, to a driving movement by a driving means for driving the reservoir, the driving means controlled by control means producing reference signals for the driving means, the reference signals representing target movements of the driving means, the method comprising the steps of:

causing the control means to send at least one test reference signal to the driving means; and detecting a position of the reservoir in response to the test reference signal, wherein said test reference signal includes a first signal interval to move the reservoir a predetermined distance from a home position in a first direction, a second signal interval to move the reservoir a predetermined number of accelerations and decelerations in a second direction opposite the first direction, and a third signal interval to move the reservoir back to the home position;

wherein the driving means undergoes slippage in response to the second signal interval, an amount of the slippage dependent upon the amount of product in the reservoir; and detecting the quantity of product remaining in the reservoir from the detected position.

49. A method according to claim 48, wherein the reference signals include at least one test reference signal corresponding to an acceleration greater than a maximum acceleration that the driving means confers to the reservoir.

50. A method for detection of a quantity of product remaining in a reservoir subjected, during use of the product, to a driving movement by a driving means for driving the reservoir, the driving means controlled by control means producing reference signals for the driving means, the reference signals representing target movements of the driving means, the method comprising the steps of:

causing the control means to send at least one test reference signal to the driving means; and detecting a position of the reservoir in response to the test reference signal, wherein said test reference signal corresponds to target movements having an acceleration greater than a maximum acceleration during use of the product, a deceleration greater than a maximum deceleration during use of the product, and/or a speed greater than maximum speed during use of the product; and detecting the quantity of product remaining in the reservoir from the detected position.

51. A method according to claim 48 or 50, wherein the reference signals include at least one test reference signal corresponding to a deceleration greater than a maximum deceleration that the driving means confers to the reservoir.

52. A method according to claim 48 or 50, wherein the reference signals include at least one test reference signal corresponding to a speed greater than a maximum speed that the driving means confers to the reservoir.

53. A method according to claim 48, wherein the position of the reservoir is detected by determining the distance that the reservoir moves to get back to the home position in response to the third signal interval.

54. A method according to claim 48 or 50, wherein said driving means is able to confer on the reservoir, for a given quantity of product in the reservoir, a maximum acceleration or deceleration and/or speed.

55. A method according to claim 54, further comprising the step of causing said control means to send test reference signals representing an acceleration or deceleration and/or a speed greater than the maximum acceleration or deceleration and/or speed, respectively.

56. A method according to claim 48 or 50, further comprising the step of causing said control means to send test reference signals representing an acceleration or deceleration and/or a speed greater than a maximum acceleration or deceleration and/or speed, respectively, of said driving means.

57. A method for detection of a quantity of product remaining in a reservoir subjected, during use of the product, to a driving movement by a driving means for driving the reservoir, the driving means controlled by control means producing reference signals for the driving means, the reference signals representing target movements of the driving means, the method comprising the steps of:

causing the control means to send to the driving means at least one test reference signal corresponding to target movements out of a range of movements during use of the product;

detecting a position of the reservoir in response to the test reference signal; and detecting the quantity of product remaining in the reservoir from the detected position.

58. A method according to claim 48, 50, or 57, wherein said test reference signal corresponds to target movements out of the range of movements during use of the product.

59. A method for detection of a quantity of product remaining in a reservoir according to claim 57, wherein said at least one test reference signal corresponding to target movements comprises a test reference signal having an acceleration greater than a maximum acceleration during use of the product, a deceleration greater than a maximum declaration during use of the product, and/or a speed greater than a maximum speed during use of the product.

60. A method according to claim 57, wherein said test reference signal corresponds to target movements having an acceleration greater than a maximum acceleration during use of the product, a deceleration greater than a maximum deceleration during use of the product, and/or a speed greater than maximum speed during use of the product.

61. A method for detection of a quantity of product remaining in a reservoir subjected, during use of the product, to a driving movement by a driving means for driving the reservoir, the driving means controlled by control means producing reference signals for the driving means, the reference signals representing target movements of the driving means, the method comprising the steps of:

causing the control means to send at least one test reference signal to the driving means; and detecting a change in temperature caused by the driving means in response to the test reference signal, whereby the quantity of product remaining in the reservoir is detected from the detected change in temperature.

62. A device according to claim 61, wherein the reference signals include at least one test reference signal corresponding to an acceleration greater than a maximum acceleration that the driving means confers to the reservoir.

63. A device according to claim 61, wherein the reference signals include at least one test reference signal corresponding to a deceleration greater than a maximum deceleration that the driving means confers to the reservoir.

64. A device according to claim 61, wherein the reference signals include at least one test reference signal corresponding to a speed greater than a maximum speed that the driving means confers to the reservoir.

65. A method according to claim 61, wherein said driving means is able to confer on the reservoir, for a given quantity of product in the reservoir, a maximum acceleration or deceleration and/or speed.

66. A method according to claim 65, further comprising the step of causing said control means to send test reference signals representing an acceleration or deceleration and/or a speed greater than the maximum acceleration or deceleration and/or speed, respectively.

67. A method according to claim 61, further comprising the step of causing said control means to send test reference signals representing an acceleration or deceleration and/or a speed greater than a maximum acceleration or deceleration and/or speed, respectively, of said driving means.

* * * * *

UNITED STATES PATENT AND TRADEMARK OFFICE
CERTIFICATE OF CORRECTION

PATENT NO. : 6,244,680 B1　　　　　　　　　　　　　　　　　　　　　Page 1 of 1
DATED : June 12, 2001
INVENTOR(S) : Christophe Truffaut et al.

It is certified that error appears in the above-identified patent and that said Letters Patent is hereby corrected as shown below:

<u>Column 1,</u>
Line 20, "product" should read -- produce --.

<u>Column 6,</u>
Line 8, "for the after" should read -- from the latter --.
Line 47, "low-power" should read -- low-power --.

<u>Column 11,</u>
Line 44, "ine" should read -- in --.

<u>Column 16,</u>
Line 18, "signals" should read -- signal --.
Line 41, "wherein" should be deleted.

<u>Column 17,</u>
Line 30, "signals" should read -- signal --.

<u>Column 19,</u>
Line 10, "maximum" should read -- a maximum --.

Signed and Sealed this

Fifth Day of March, 2002

*Attest:*

*Attesting Officer*　　　　　　　JAMES E. ROGAN
　　　　　　　　　　　　　　*Director of the United States Patent and Trademark Office*